United States Patent [19]

Fushimi et al.

[11] Patent Number: 4,972,411
[45] Date of Patent: Nov. 20, 1990

[54] SIGNALLING TRANSMISSION SYSTEM

[75] Inventors: Wataru Fushimi; Noriaki Kawano; Yushi Naito, all of Kanagawa, Japan

[73] Assignee: Mitsubishi Denki Kabushiki Kaisha, Tokyo, Japan

[21] Appl. No.: 343,400

[22] Filed: Apr. 25, 1989

[30] Foreign Application Priority Data

Apr. 27, 1988 [JP] Japan ................................ 63-104766

[51] Int. Cl.[5] ............................................... H04J 3/12
[52] U.S. Cl. .................................. 370/110.1; 370/68.1
[58] Field of Search .................. 370/68.1, 110.1, 110.2, 370/110.4

[56] References Cited

U.S. PATENT DOCUMENTS

| 4,032,719 | 6/1977  | Blasbalg        | 370/66     |
|-----------|---------|-----------------|------------|
| 4,434,486 | 2/1984  | Barner          | 370/110.1  |
| 4,538,263 | 8/1985  | Gabrielli et al.| 370/85.12  |
| 4,630,262 | 12/1986 | Callens et al.  | 370/110.1  |

OTHER PUBLICATIONS

Japanese Patent Application Public Disclosure No. 43030/1986.
Japanese Patent Application Public Disclosure No. 78235/1986.
Japanese Patent Application Public Disclosure No. 157099/1986.

Primary Examiner—Douglas W. Olms
Assistant Examiner—Christopher O. Edwards
Attorney, Agent, or Firm—Wolf, Greenfield & Sacks

[57] ABSTRACT

A signalling transmission system is disclosed which consists of a transmitting module including a signalling variation detecting unit and a signalling synthesization unit, and a receiving module including a signalling flag detecting unit and a signalling separation unit. The signalling synthesization unit makes composition signals by inserting signalling signals into voice signals together with a flag when signalling variations are detected by the variation detecting unit. A flag detecting unit detects a flag contained in the composition signals received by the receiving module and instructs the separating unit to separate the signalling signals from the voice signals contained the composition signals when the flag shows that the composition signals include the signalling signals. The signalling signals and the voice signals are therefore output from the receiving module.

8 Claims, 5 Drawing Sheets

VOICE SIGNAL

SIGNALLING SIGNAL

SIGNALLING TRANSMISSION SYSTEM

BACKGROUND OF THE INVENTION

1. Field of the Invention

The present invention is directed to a signalling transmission system for transmitting and receiving voice and signalling signals via, for example, a telephone line.

2. Description of the Prior Art

Turning first to FIG. 1, a block diagram of a conventional signalling transmission system is illustrated.

In FIG. 1, the reference numeral 1 denotes an encoding module which incorporates a voice encoder, generally indicated at 2, for encoding voice signals into 320 bits/frame at a bit rate of 16 kbps, namely 20 msec/frame, and a signalling encoder, generally denoted as 3, for encoding signalling signals by sampling it at a frequency of 800 Hz. The numeral 4 represents an input signal line for inputting the voice signals; 5 an input signal line for inputting the signalling signals; 6 an output signal line, dedicated to transmission at the bit rate of 16 kbps for outputting the voice signals encoded by the voice encoder 2; and 7 an output signal line, dedicated to transmission at a bit rate of 800 bps for outputting the signalling signals encoded by the signalling encoder 3.

The numeral 10 designates a decoding module which incorporates a voice decoder, generally identified as 11, for decoding the encoded voice signals of 16 kbps into the original voice signals, and a signalling decoder, generally denoted as 12, for decoding the encoded signal signals of 800 bps into the original signalling signals. The numeral 13 denotes an input signal line for inputting the voice signals which have the bit rate of b 16 kbps to the voice decoder 11; 14 an input signal line for inputting the signalling signals which dedicates the bit rate of 800 bps to the signalling decoder 12; 15 an output signal line for outputting the voice signals decoded by the voice decoder 11; 16 an output signal line connected with the signalling decoder 12; 20 a channel transmission path through which the voice signals of 16 kbps are transmitted from the output signal line 6 to the input signal line 13; and 21 a channel transmission path through which the signalling signals of 800 bps are transmitted from the output signal line 7 to the input signal line 14.

Under such an arrangement, encoding module 1 may be regarded as a transmitting module, whereas the decoding module 10 may be defined as a receiving module.

The description will next deal with the function of the system.

When the voice signals are input via the input signal line 4 to the voice encoder 2, the voice encoder 2 encodes the voice signals into 320 bits/frame with 20 msec/frame and transmits these signals encoded at 16 kbps to the output signal line 6. A synchronization signal consisted of 4 bits is incorporated in the top of the frame.

When the signalling signals are received through the input signal line 5, the signalling encoder 3 operates to encode these signalling signals by sampling it at a frequency of 800 Hz and transmitting the signals encoded at 800 bps on the output signal line 7.

The voice and signalling signals on the output signal lines 6 and 7 are transmitted to the decoding module 10 through the voice signal channel transmission path 20 dedicated to 16 kbps transmission and the signalling signal transmission path 21 dedicated to 800 bps transmission, respectively.

On the receiving side, the voice and signalling signals transmitted via the respective channel transmission paths 20 and 21 are decoded by means of the voice decoder 11 and signalling decoder 12, and are then output therefrom. FIG. 2 illustrates a transmission form for a voice group, while FIG. 3 depicts a transmission form for a signalling group. Note that the numerals shown in FIGS. 2 and 3 correspond to those with which the blocks and signal lines are marked in FIG. 1.

The encoded voice signals and the encoded signalling signals may be transmitted via physically separated digital transmission paths 20 and 21 as indicated in FIG. 1, or also may be transmitted via time-division-multiplexed one digital transmission line occupying transmission channel capacity of 16.8 kbps.

The prior art signalling transmission system is, as discussed above, adapted to transmit and receive the signalling signals separately from the voice signals via the individual transmission channel, and is therefore associated with a problem of decreasing transmission efficiency.

SUMMARY OF THE INVENTION

It is a primary object of the present invention, which has been made to obviate the foregoing problem, to provide a signalling transmission system capable of improving transmission efficiency.

According to one aspect of the invention, a signalling transmission system is provided comprising: a transmitting module including a signalling variation detecting unit for extracting the signalling signals of one frame period containing signal variation points by detecting the variations in the signalling signals, and a signalling synthesization unit for synthesizing composition signals by inserting the signalling signals into the encoded voice signals together with a flag indicative of whether the voice signals contain the signalling signals or not; and a receiving module including a signalling flag detecting unit for detecting the flag contained in the received composition signals, and a signalling separation unit for separating the signalling signals inserted into the voice signals on the basis of the flag detected by the flag detecting unit, whereby the transmitting module works to transmit the signalling signals containing the signal variation points, the signalling signals being inserted into the encoded voice signals together with the flag only when there is any variation caused in the signalling signals, and when the signalling signals containing the signal variation points are separated from the voice signal on the basis of the flag, the receiving module can obtain the separated signalling signals when the signalling signals are not separated therefrom, namely the flag means no insertion of the signalling signals, the previously detected and separated signalling signals are defined as the signalling signals of the present frame period at that time.

BRIEF DESCRIPTION OF THE DRAWINGS

Other objects and advantages of the invention will become apparent during the following discussion in conjunction with the accompanying drawings, in which.

DESCRIPTION OF THE PREFERRED EMBODIMENT

The embodiment of the present invention will hereinafter be described with reference to the accompanying drawings.

The same components as those shown in the prior art are marked with the same symbols, and the explanation is therefore omitted herein.

Figure 1:
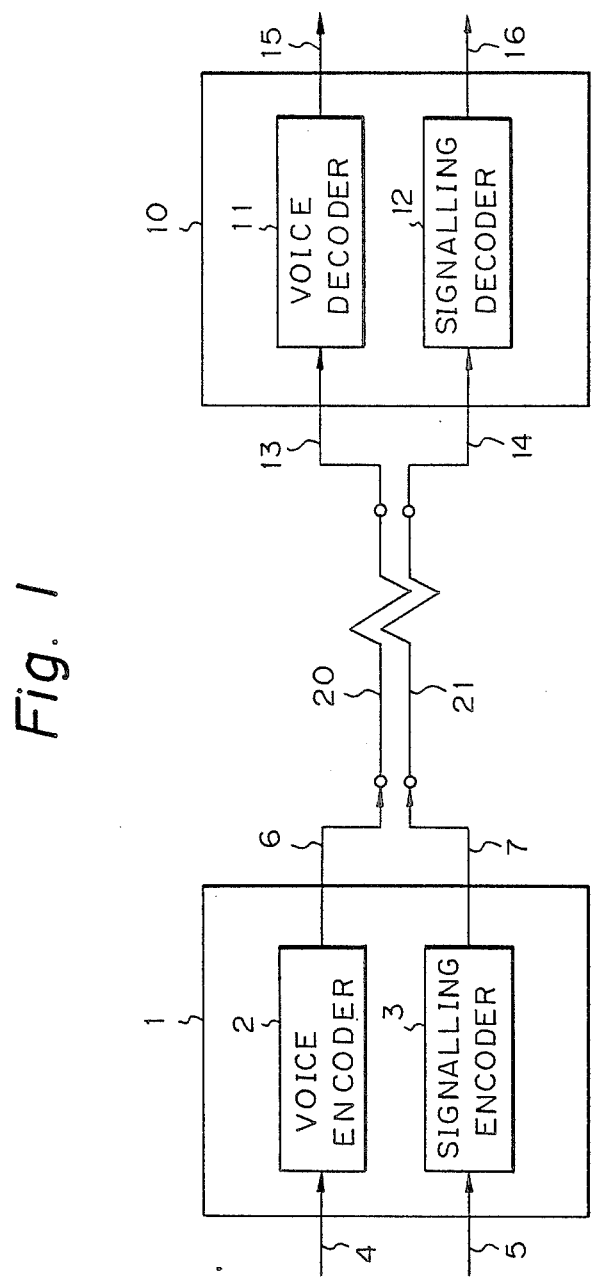
FIG. 1 is a block diagram illustrating a conventional signalling transmission system.
Figure 2:
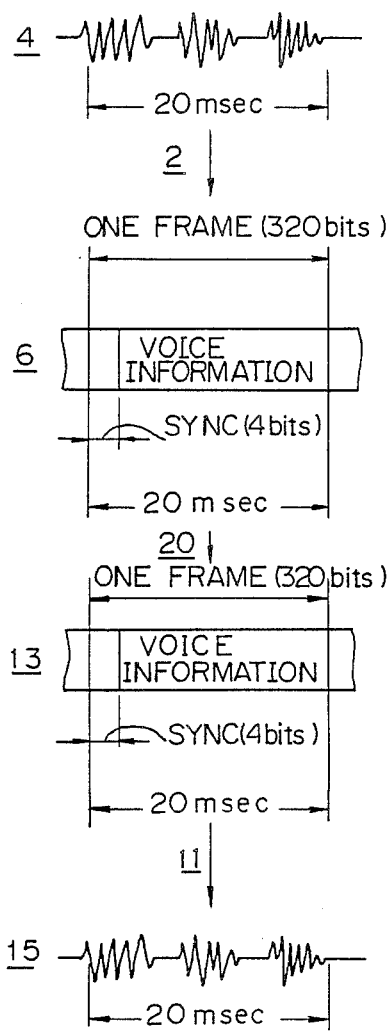
FIGS. 2 and 3 are format diagrams depicting formats of transmission signals of respective components both of a voice group and a signalling group in the prior art system shown in FIG. 1.
Figure 3:
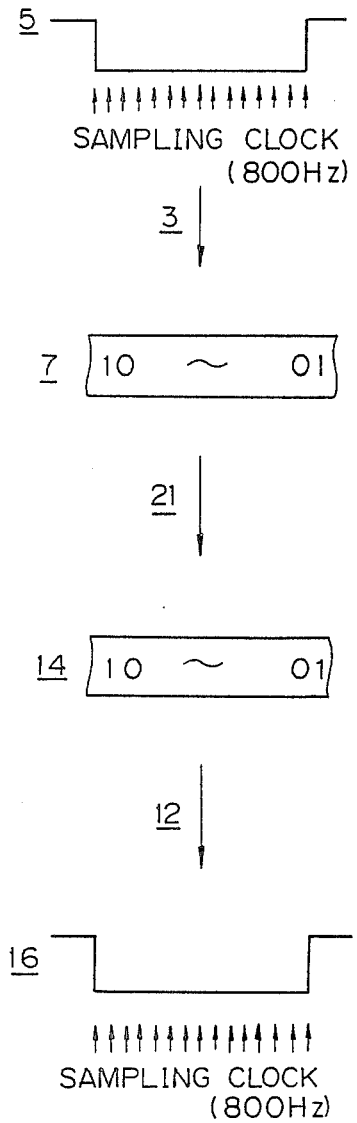
Figure 4:
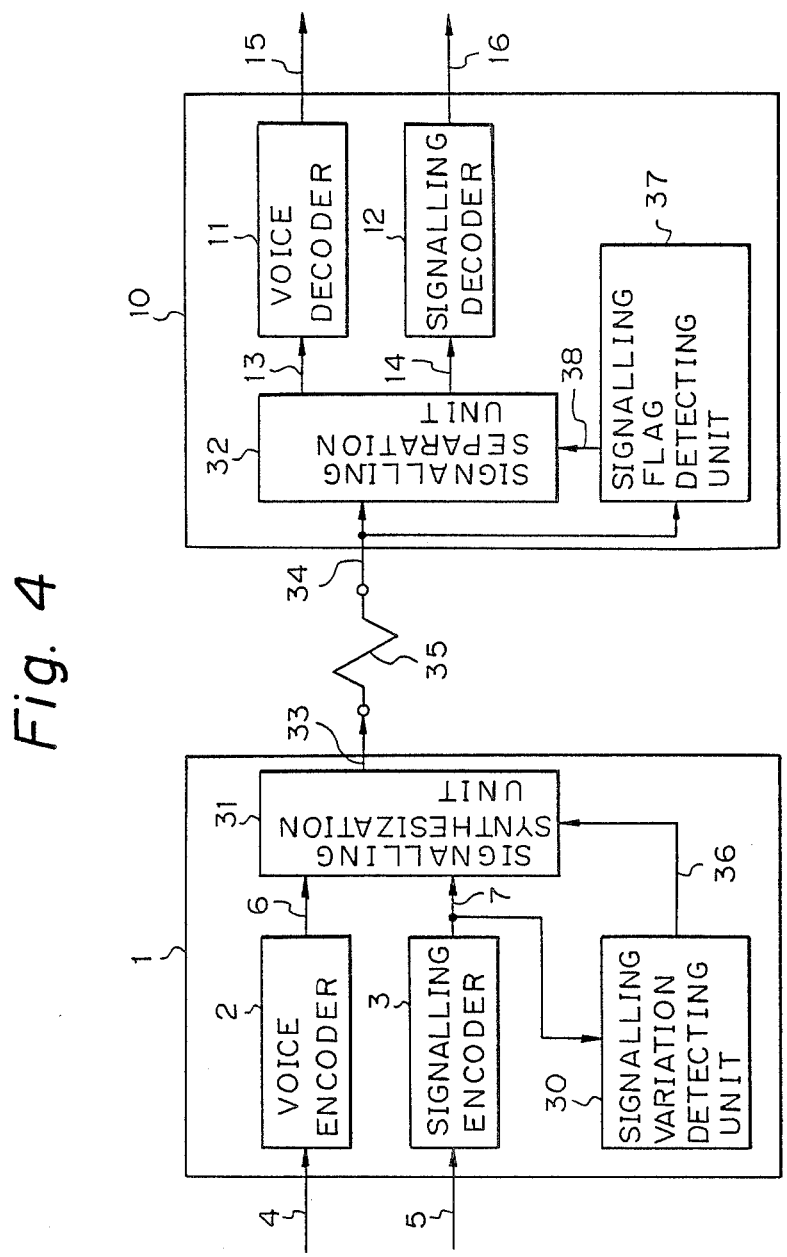
FIG. 4 is a block diagram illustrating a signalling transmission system in one embodiment of the present invention.

Referring to FIG. 4, one embodiment of the present invention is shown as a block diagram form. In FIG. 4, the reference numeral 30 represents a signalling variation detecting unit for detecting signalling variations of totally 17 signalling samples, i.e., 16 signalling samples of one frame period, which are sent from a signalling encoder 3, plus the last signalling sample of 16 signalling samples of the previous frame period. A signalling synthesization unit 31 serves to synthesize composition signals by inserting encoded signalling signals transmitted from the signalling encoder 3 together with the flag into encoded voice signals transmitted from a voice encoder 2. A signalling separation unit 32 functions to separate the 16-sample signalling signals of one frame period from the transmitted composition signals. The numeral 33 denotes a signal line for transmitting the encoded voice signals in case no signalling signal variation occurs within the frame period, or the composition signals which are the encoded signalling signals inserted into the encoded voice signals in case the signalling signal variation occurs within the frame period, sent from the signalling synthesization unit 31. The numeral 34 designates a signal line for inputting the composition signals to the signalling separation unit 32 sent from the signalling synthesization unit 31. The numeral 35 represents a 16 kbps transmission path like a digital telephone line. An insertion information signal line 36 is designed for informing the signalling synthesization unit 31 that the signalling signals of one frame period containing the signal variation points are detected. A signalling flag detecting unit 37 detects and distinguish a flag inserted into the voice signals transmitted from the signalling synthesization unit 31. A flat information signal line 38 is intended to inform the signalling separation unit 32 whether the flag detected at the flag detecting unit 37 means signalling signals are inserted or not. The operation of the system will now be described.

In the transmitting module, when the voice signals are input via the input signal line 4 to the voice encoder 2, this voice encoder 2 encodes the voice signals into a 320-bit frame and 20 msec/frame. Upon inputting the signalling signals via the input signal line 5 to the signalling encoder 3, this signalling encoder 3 samples and encodes the signalling signals at a frequency 800 Hz, and outputs then at a bit rate of 800 bps to the signal line 7. The output signals of the encoder 3 are input to the signalling variation detecting unit 30 and signalling synthesization unit 31 through the signal line 7. The signalling variation detecting unit 30 detects variations from High to Low and vice versa with respect to the total of the 17 signalling samples—viz., 16 signalling samples of one frame period plus the final signalling samples 16 signalling samples of the previous frame period. Thereafter, the signalling variation detecting unit 30 also transmits a piece of the signalling insertion information via the signalling insertion information signal line 36 to the signalling synthesization unit 31.

At the same moment, 16 signalling samples of one frame period are transmitted through the signal line 7 to the signalling synthesization unit 31, in which a 2-bit signalling insertion flag and 16 signalling samples are inserted into a 320-bit voice frame (20 msec/frame). In the signalling variation detecting unit 30, if no signalling variation appears, only the 2-bit flag indicative of no insertion signalling signal is inserted via the signalling insertion information signal line 36 into the 320-bit voice frame. In this manner, the composition signal is formed.

On the other hand, the signalling flag detecting unit 37 in the receiving module detects the 2-bit flag included in the composition signals through the line 34. Soon after the flag, which shows a signalling signal to be inserted, has been detected, the flag information is imparted via the flag information signal line 38 to the signalling separation unit 32.

Figure 5:
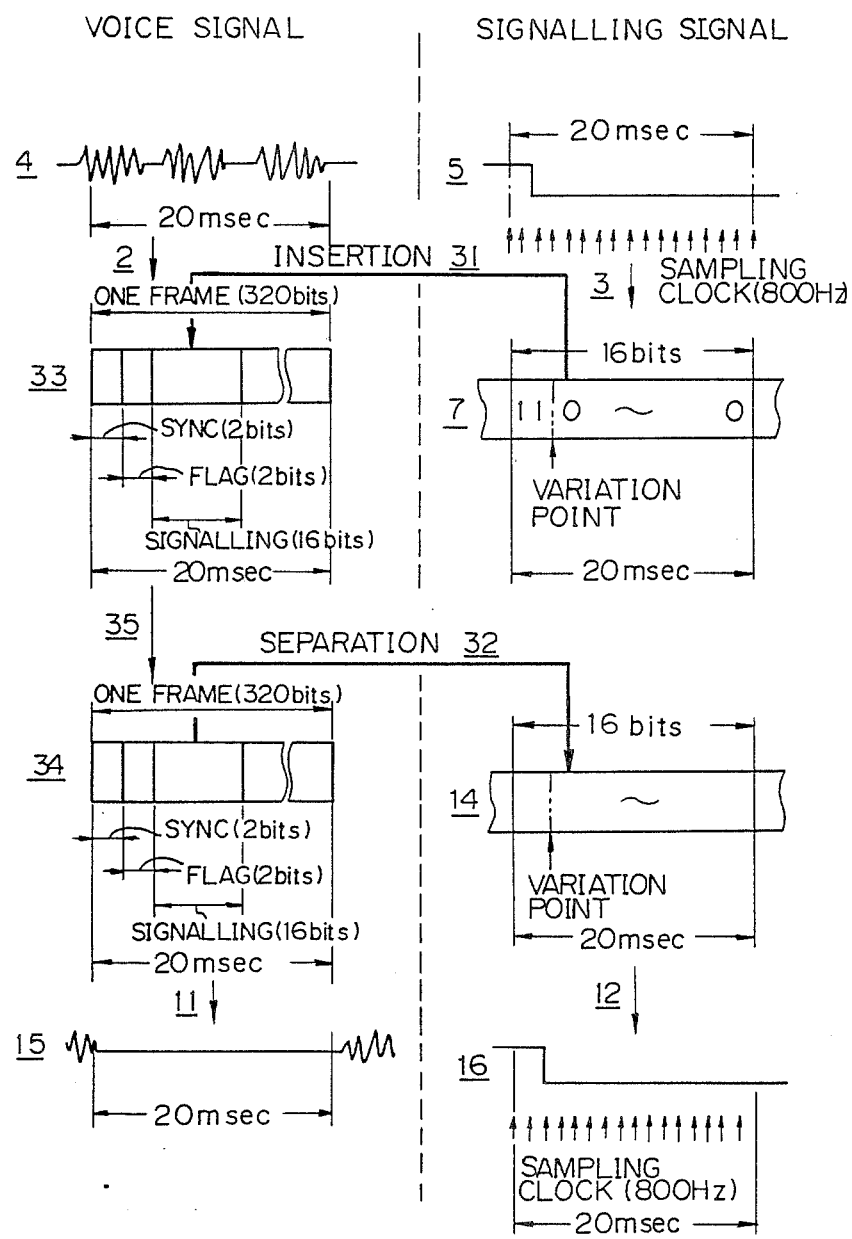
FIG. 5 is a format diagram depicting formats of a signalling signal transmission according to the present invention in a case where signalling variation is detected in the embodiment shown in FIG. 4.
Figure 6:
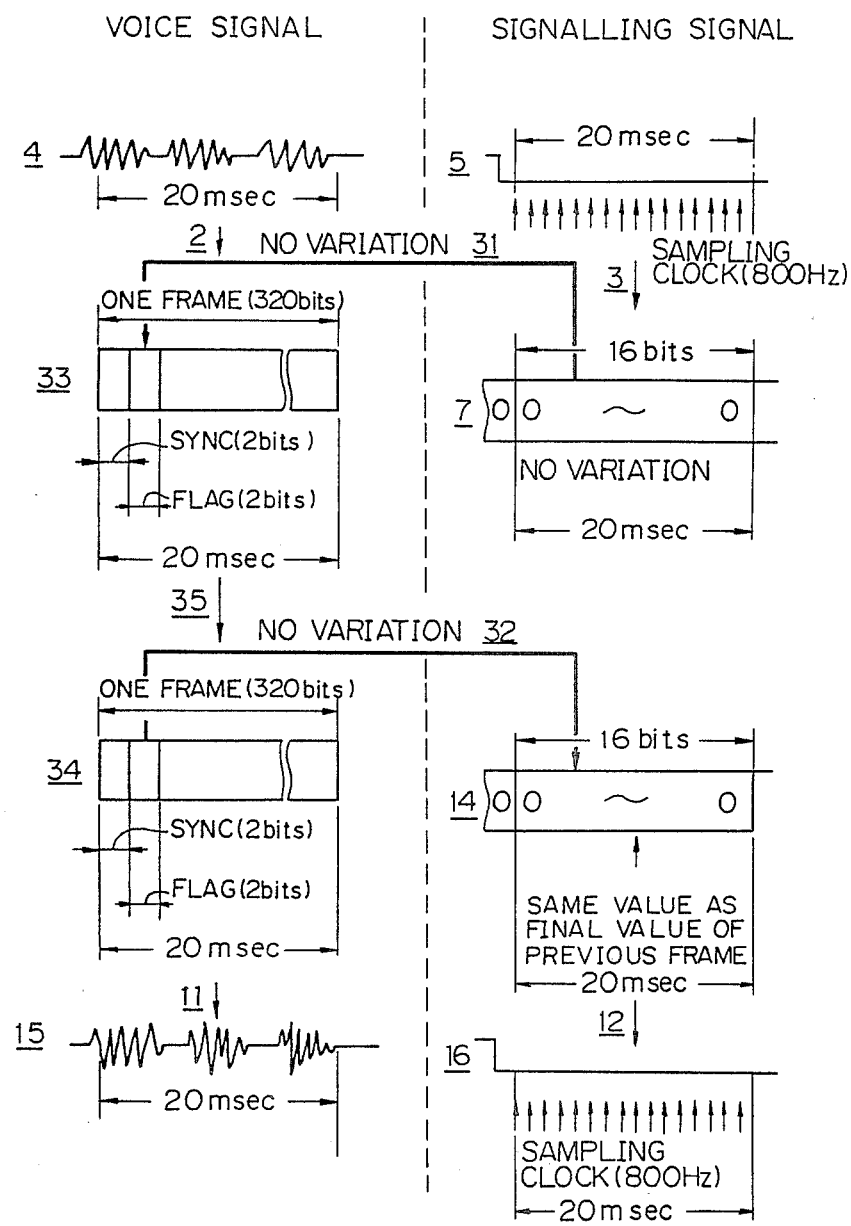
FIG. 6 is a format diagram depicting signal formats in a case where no signalling variation is detected in the embodiment shown in FIG. 4.

Based on the flag information showing the insertion given from the signalling flag detecting unit 37, the signalling separation unit 32 performs to separate the 16-sample signalling signal of one frame period from the composition signal, the voice signals are then supplied to voice decoder 11, while the signalling signals are supplied to the signalling decoder 12. The voice signals in which the data are stopped by the signalling insertion, and hence, in this frame, the voice decoder does not perform its decoding process but outputs a silent signal. FIG. 5 depicts formats in the signalling transmission when the signalling variations are detected, wherein the numerals correspond to those with which the components and the signal lines are marked in FIG. 4. In the signalling flag detecting unit 37, if the flag which shows no signalling signal to be inserted is detected, this fact is conveyed via the flag information signal line 38 to the signalling separation unit 32. The signals on the 16 kbps (320 bits/frame, and 20 msec/frame) signal line 34 is input directly through the signalling separation unit 32 as well as through signal line 13 to the voice decoder 11. The voice decoder 11 behaves to output decoded voice signals to the voice signal output line 15. At that time, an output signal of the signalling separation unit 32 to the signalling decoder 12 through the line 14 is a value of the final signalling sample which is arranged in the detected signalling signals of the previous frame period. The signalling decoder 12 decodes the encoded signalling signals from the signal line 14 and outputs the decoded signals to signalling signal line 16. FIG. 6 illustrates formats in the signalling transmission when no signalling variation is detected, wherein the numerals correspond to those with which the components and the signal lines are marked in FIG. 4.

In accordance with the above-mentioned embodiment, the frame period is set to 20 msec; the frame is defined by 320 bits; the signalling sampling clock is set at 800 Hz; one frame period signalling sampling numbers are 16; the frame sync bit is set to 2 bits; and the signalling variation detecting flag is defined by 2 bits. However, so far as there is a system adopted to detect the signalling variations per frame where the signalling variation detecting flag and the sampled signalling are inserted into the frame the same effects can be obtained in any similar manners to set up the foregoing factors.

As discussed above, the signalling transmission system according to the present invention comprises: the signal transmitting module including the signalling variation detecting unit for detecting the signal variations in the signalling signals of one frame period, and the signalling synthesization unit for synthesizing the composition signals by inserting signalling signals into the voice signals together with the flag indicating whether the voice signals contain the signalling signals or not; and the receiving module including the signalling flag detecting unit for detecting the flag contained in the composition signal, and the signalling separation unit for separating the signalling signals inserted into the voice signals on the basis of the flag detected by the flag detecting unit, whereby the transmitting module works not only to transmit the voice signals but also to transmit the signalling signals containing the signal variation points when there are the variations in the signalling signals, and in the receiving module, only when the signalling signals containing the signal variation points are separated from the voice signals or the composition signals on the basis of the detected flag, the module obtains the separated signalling signals, and when any signalling signal is not separated therefrom the final value of the previously detected signalling signals is produced as the signalling signals of the present frame period transmitted from the transmitting module. With this arrangement, the transmission efficiency is remarkably ameliorated because no signalling signal is required to be inserted into the voice signals when no variation can be seen in the signalling signals, and the number of the transmission lines can be reduced.

Although the illustrative embodiment of the present invention has been described in greater detail with reference to the accompanying drawings, it is to be understood that the invention is not limited to the precise embodiment. Various changes or modifications may be effected therein by one skilled in the art without departing from the scope or spirit of the invention.

What is claimed is:

1. A signalling transmission system for transmitting and receiving voice signals and signalling signals between a transmitting module and a receiving module, comprising:
    a transmitting module including a signalling variation detecting unit for detecting signal variations in said signalling signals of one frame, and a signalling synthesization unit for synthesizing composition signals by inserting said signalling signals into said voice signals when said variations are detected by said detecting unit together with a flag indicating whether said composition signals contain said signalling signals or not; and
    a receiving module including a signalling flag detecting unit for detecting the flag contained in said composition signals received from said transmitting module, and a signalling separation unit for separating the signalling signals included in said received composition signals from the voice signals thereof on the basis of said flag detected by said flag detecting unit, whereby said transmitting module works to transmit said signalling signals containing said signal variation points, said signalling signals being inserted into said voice signals together with said flag only when said variations in said signalling signal are detected, and in said receiving module, when said signalling signals containing said signal variation points are separated from said voice signals on the basis of said detected flag, said separated signalling signals of the present frame period are obtained, and when no signalling signal is separated from said voice signals on the basis of said detected flag, a final value of said detected signalling signals of the previous frame period is output as the value of the signalling signals of the present frame period transmitted from said transmitting module.

2. A system as claimed in claim 1, wherein said transmitting module including encoding means for encoding said voice signals and said signalling signals before said detection of said signal variations and synthesization of said composition signals, and said receiving module including decoding means for complementarily decoding said separated voice signals and said signalling signals.

3. A system as claimed in claim 1, wherein said separation unit outputs said separated signalling signals of the previous frame when the separation unit receives said flag indicating that said composition signals contain no signalling signal.

4. A system as claimed in claim 2, wherein said decoding means outputs a silent signal when no voice signal is input hereto.

5. A signalling transmission method of effecting frame-based transmitting/receiving operations of voice signals and signalling signals between a transmitting module and a receiving module, comprising the steps of:
    (a) detecting signal variations in said signalling signals of one frame containing signal variation points by a signalling variation detecting unit in said transmitting module;
    (b) synthesizing composition signals by inserting said signalling signals into said voice signals when said variation detected by said variation detecting unit, together with a flag indicating whether said composition signals contains said signalling signals or not by a signalling synthesization unit in said transmitting module;
    (c) transmitting said composition signals to said receiving module through a transmission line path;
    (d) separating the signalling signals from the voice signals both included in said received composition signals by a signalling separation unit after detecting the flag contained in said received composition signals by a signalling flag detecting unit in said receiving module; and
    (e) outputting said separated voice signals and signalling signals.

6. A method as claimed in claim 5 further comprising the steps of:
    encoding said signalling signals and voice signals by encoding means before said detection of signalling variations and synthesization of said composition signals in said transmitting module; and
    decoding said separated voice signals and said signalling signals by decoding means in said receiving module.

7. A method as claimed in claim 6, wherein said decoding means outputs a silent signal when no voice signal is input hereto.

8. A method as claimed in claim 5, wherein said separated signalling signals of the previous frame are output again when no signalling signal of the present frame is separated by said signalling separation unit.